March 7, 1933.   L. O. GRONDAHL   1,900,404
APPARATUS FOR THE CONTROL OF VEHICLE BRAKES
Filed March 21, 1931   4 Sheets-Sheet 1

INVENTOR:
L. O. Grondahl,
by A. L. Vincill
His ATTORNEY.

March 7, 1933.    L. O. GRONDAHL    1,900,404
APPARATUS FOR THE CONTROL OF VEHICLE BRAKES
Filed March 21, 1931    4 Sheets-Sheet 2
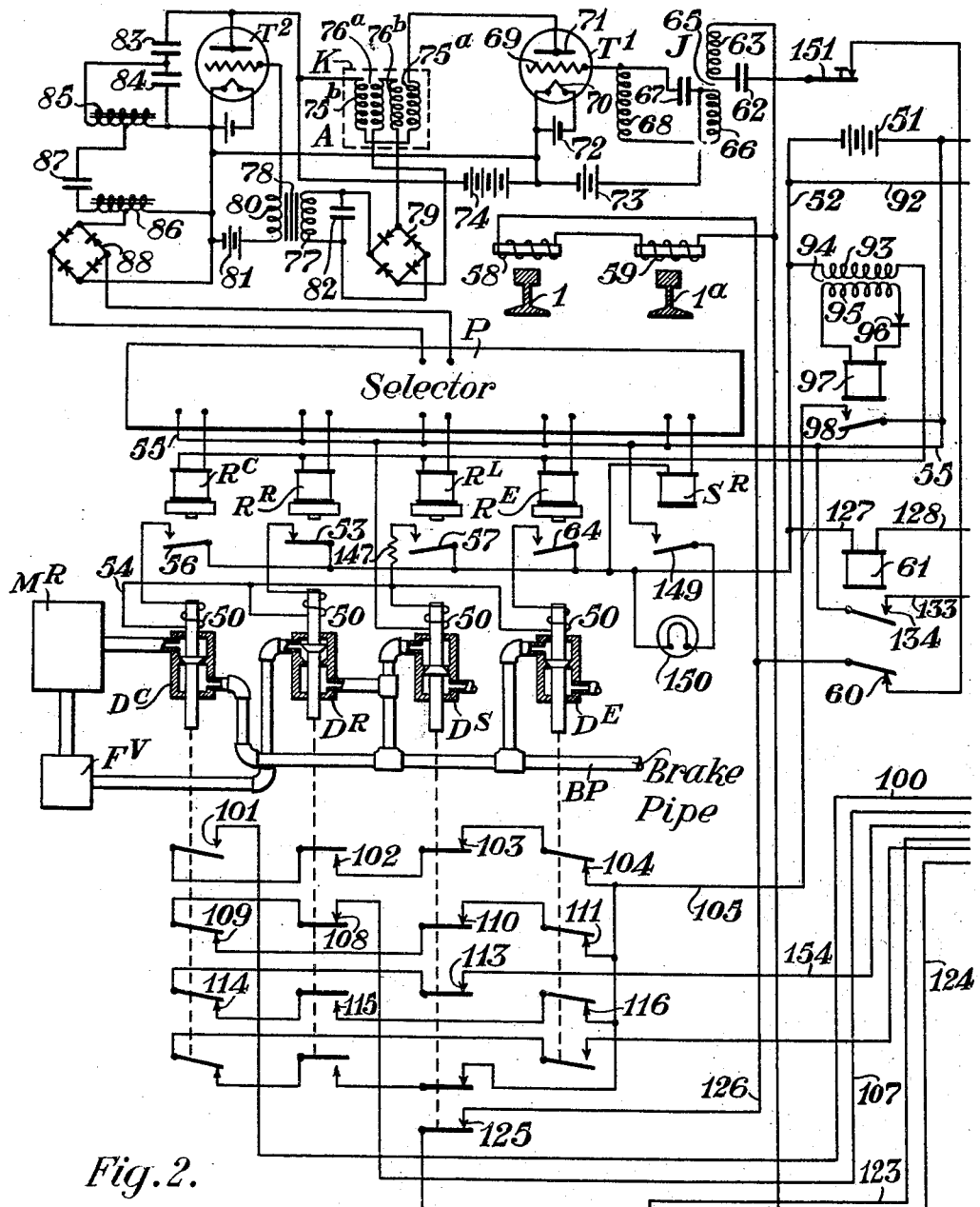
Fig. 2.
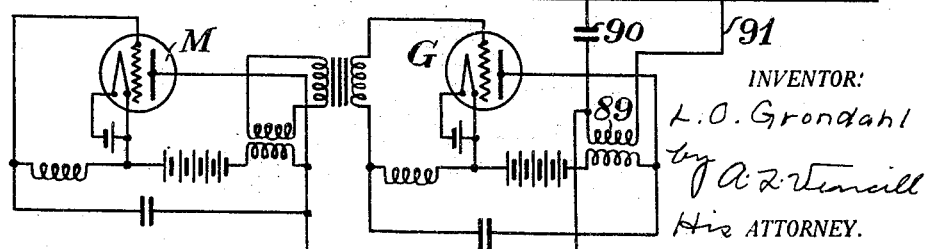
INVENTOR:
L. O. Grondahl
by A. L. Vinsall
His ATTORNEY.

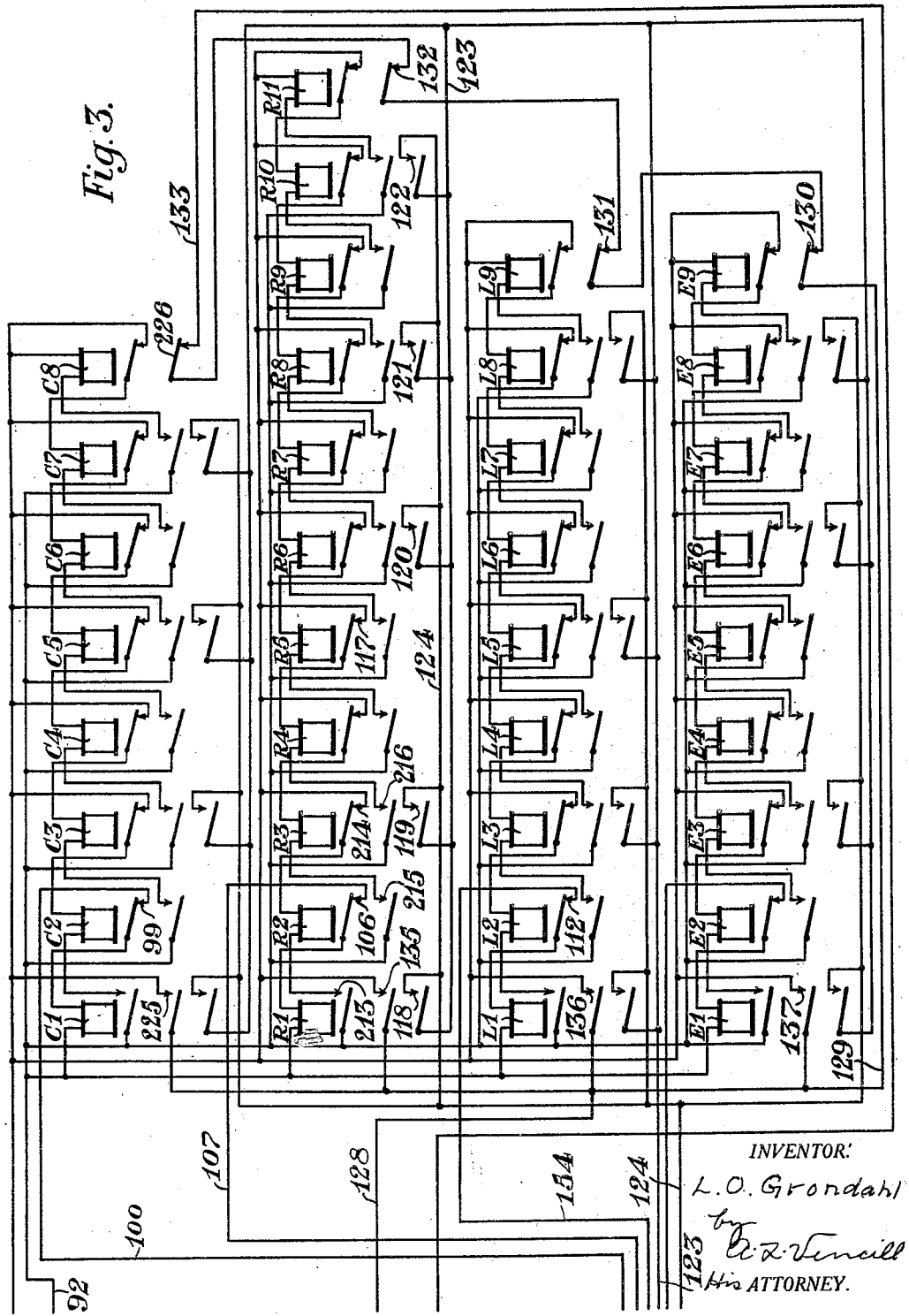

March 7, 1933.  L. O. GRONDAHL  1,900,404
APPARATUS FOR THE CONTROL OF VEHICLE BRAKES
Filed March 21, 1931  4 Sheets-Sheet 4

INVENTOR:
L. O. Grondahl
BY
His ATTORNEY.

Patented Mar. 7, 1933

1,900,404

UNITED STATES PATENT OFFICE

LARS O. GRONDAHL, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

APPARATUS FOR THE CONTROL OF VEHICLE BRAKES

Application filed March 21, 1931. Serial No. 524,305.

My invention relates to apparatus for the control of vehicles brakes, and particularly to apparatus for the control of railway train brakes in which the functions of the usual engineer's brake valve are produced by a brake control mechanism located at one point on the train and controlled from a second point. One feature of my invention is the provision of apparatus that will permit signals to be exchanged between the point at which the brake controlling mechanism is located and the point from which said mechanism is controlled.

I will describe certain forms of apparatus embodying my invention, and will then point out the novel features thereof in claims.

Figure 1:
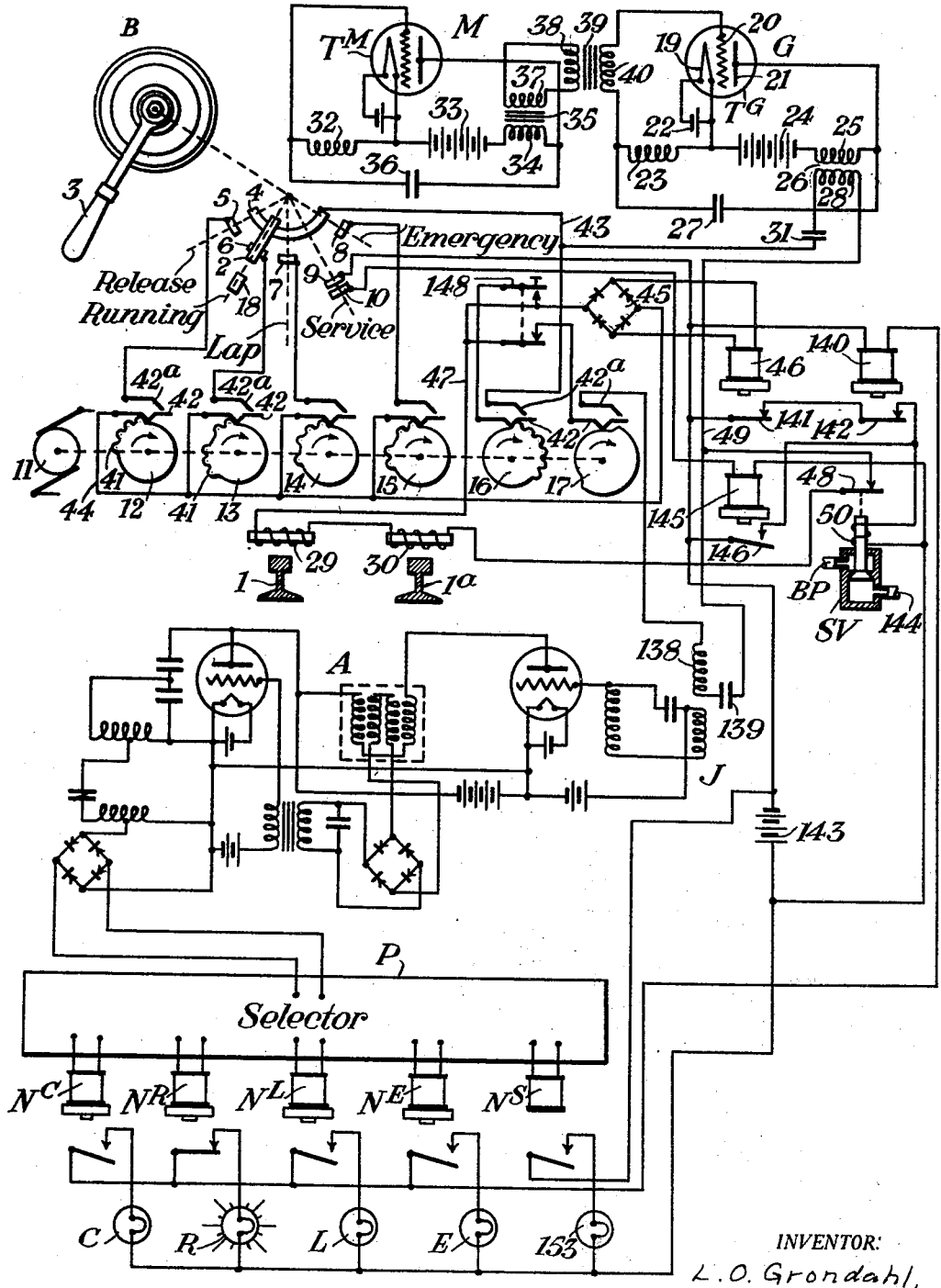
Figure 6:
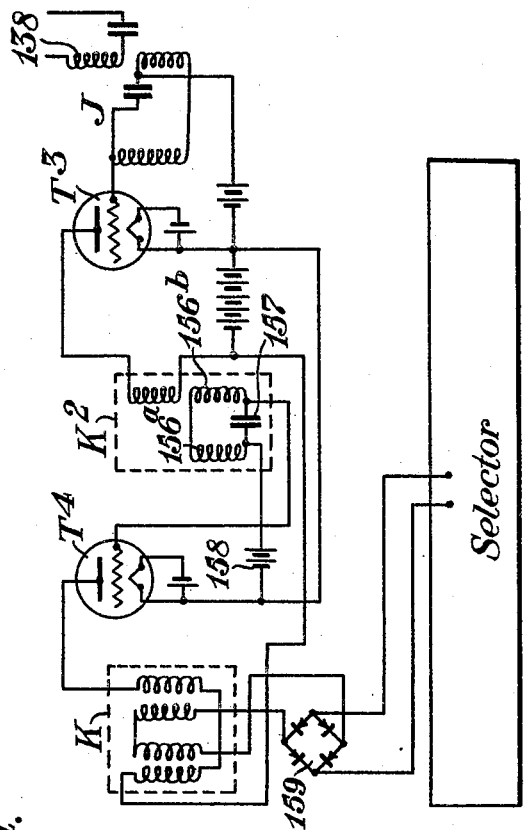
Figure 4:
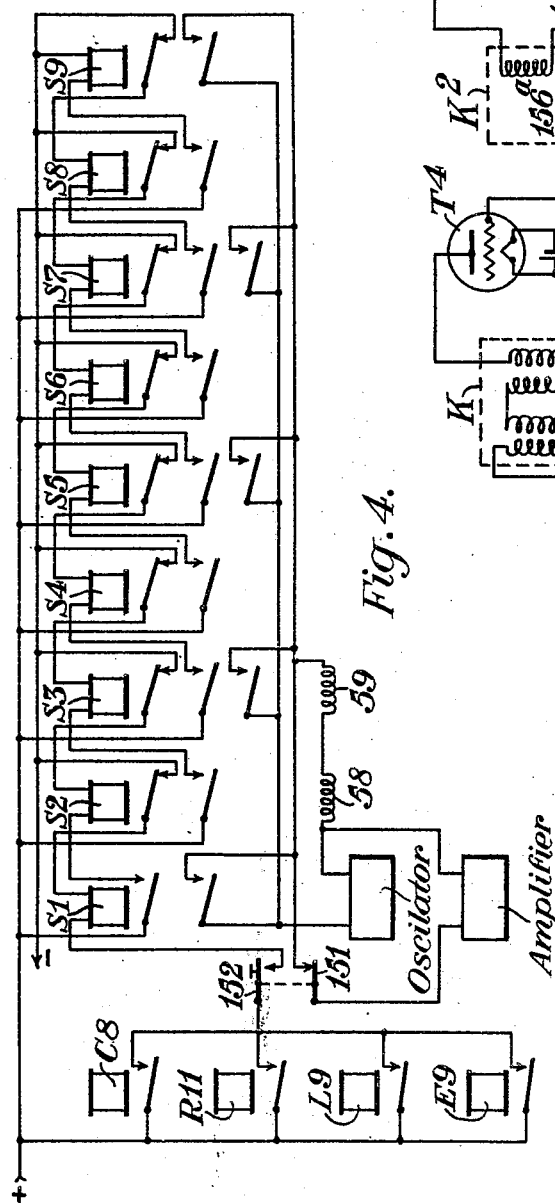
Figure 5:
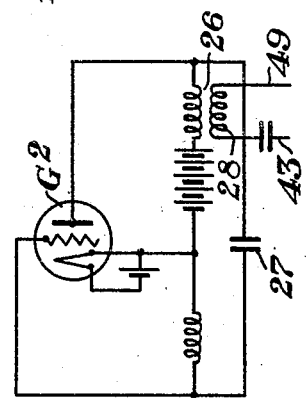

In the accompanying drawings, Fig. 1 is a diagrammatic view of one form of apparatus embodying my invention for transmitting the control influences to the brake controlling mechanism and for receiving and indicating the influences set up by the brake controlling mechanism and also for signaling, and in this instance this apparatus is shown located on a locomotive. Figs. 2 and 3 when placed together with the right-hand side of Fig. 2 adjacent the left-hand end of Fig. 3, form a diagrammatic view of one form of brake controlling mechanism to be installed at some point on the train other than the control point. While the location of this brake controlling mechanism shown in Figs. 2 and 3 may be at any point on the train, it will be spoken of in this description as being carried in the caboose in order to clarify the description. Fig. 4 is a diagrammatic view of the apparatus in the caboose for sending a signal to the locomotive or point of control. Fig. 5 is a diagrammatic view of a modified form of generator that may be used with my invention, and the Fig. 6 is a diagrammatic view of one form of receiving apparatus that may be used with the generator of Fig. 5.

Referring to Fig. 1, the engineer's brake valve B is of any of the well known types capable of assuming the several brake controlling positions "release", "running", "lap", "service" and "emergency". As shown schematically, the contact members 2 and 18 are operatively connected to and actuated by the handle 3 of the brake valve B. The contact member 2 is adapted to engage the arcuate contact member 4 in all positions of the valve B, and also to engage a series of contacts 5, 6, 7 and 8 when the valve occupies its "release", "running", "lap" or "emergency" position, respectively. The contact member 18 is adapted to bridge the two contact members 9 and 10 when the valve handle occupies the "service" position only.

Located on the locomotive is a generator G of alternating carrier current, the frequency of which may, for example, be 3500 cycles per second. As here shown, this generator is of the vacuum tube oscillator type comprising an electron tube $T^G$ which contains the usual filament 19, grid 20 and plate 21. The filament 19 is constantly heated by the battery 22 and there is provided a grid circuit including the reactance 23. Tube $T^G$ is also provided with a plate circuit including a battery 24 and a primary 25 of a transformer 26. Connected in series with the reactance 23, battery 24 and primary 25 is a condenser 27. In accordance with the usual practice, the windings 23 and 25 are closely coupled to provide for mutual induction between them, although, to simplify the drawings they are shown spaced apart. The output frequency of the generator G is determined by the combined characteristics of condenser 27, reactance 23 and primary 25. The secondary 28 of the transformer 26 is at times included in a series circuit with the two windings 29 and 30 located in inductive relation with the two traffic rails 1 and 1ª, respectively, which circuit is tuned by a condenser 31 to resonance at the output frequency of the generator G.

Also located on the locomotive is a second generator M which I will term a "modulation" generator because its output is used to modulate the carrier current output of the generator G. The generator M is likewise of the electron tube oscillator type comprising a tube $T^M$. The grid circuit includes a reactance 32, and the plate circuit includes a battery 33 and a primary 34 of a transformer 35, while the elements 32, 33 and 34 are connected in series through a condenser 36 in the same manner as the corresponding elements 23, 24, 25 and 27 of the generator G. Windings 32 and 34 are closely coupled to each other for the same reason as stated in describing the elements 23 and 25. The secondary 37 of the transformer 35 is connected to the primary 38 of a transformer 39, the secondary 40 of which is included in the grid circuit of the generator G, whereby the output of generator G is modulated at the frequency of the current delivered by the generator M whose frequency is determined by the condenser 36 and the combined reactance of windings 32 and 34.

The modulated carrier current supplied by the secondary 28 to the coils 29 and 30 is coded, there being a separate code for each of the positions "release", "running", "lap" and "emergency" of the brake valve B. On the locomotive there is provided a direct current motor 11 supplied with power from the headlight generator (not shown) or some other convenient source of current. The motor 11 is coupled either directly or preferably through gears to six cams 12, 13, 14, 15, 16 and 17. The cams 12, 13, 14 and 15 are used for coding the output of the carrier current corresponding to "release", "running", "lap" and "emergency" positions of the brake valve B, respectively. The cam 16 is used for delivering a signaling code, and the cam 17 is associated with the locomotive carried receiving apparatus. The direction of rotation of the several cams is clockwise as indicated by the arrows and each of the respective cams 12, 13, 14, 15 and 16 are provided with a predetermined number of suitable spaced cam lobes 41, which are adapted to periodically close a contact 42—42ª included in the circuit leading from the secondary 28 to the coils 29 and 30. With the handle 3 in the running position, as shown in the Fig. 1, the connection for the secondary 28 extends through the condenser 31, wire 43, the segment 4, contact piece 2, segment 6, contact 42ª—42 of cam 13, wire 44, one leg of a full-wave rectifier 45, coil of a slow-releasing relay 46, second leg of rectifier 45, wire 47, coils 29 and 30, contact 48, operated by a service magnet valve SV to be described later, and wire 49 to the opposite terminal of the secondary 28. When the brake valve handle 3 is placed in the release position, then the circuit extending from the secondary 28 includes the segment 5 and the contact 42—42ª closed intermittently by the lobes 41 of the cam 12. Likewise with the handle 3 placed in the "lap" position, the circuit is intermittently closed by the cam lobes 41 of the cam 14, and when the valve B is in the "emergency" position, the circuit is interrupted by the cam 15. It is to be noted that no circuit for secondary 28 to the coils 29 and 30 is provided when the brake valve occupies the "service" position. The reason for this arrangement will be fully described later in the specification.

One of the features of my invention, resides in the dividing of time into a plurality of alternating periods with the apparatus arranged to perform a given function during each respective period of time. In the form here described, the time required for the cams to make a complete revolution is taken as representing a unit of time and this unit is divided into three equal periods. Looking at the cams of Fig. 1 and considering them to start from the position as shown in the figure and to rotate in a clockwise direction, the first 120 degrees of a revolution is used for sending a control code from the locomotive. To this end, the cam lobes 41 of each of the cams 12, 13, 14 and 15 are located in the same 120° sector. It follows that whichever cam is selected, depending upon the position of the brake valve, the control code delivered by the generator to the inductors 29 and 30 will occur in each case during the same 120° of a revolution which, in this instance, is the first 120° of the revolution. In other words, the control code takes place during the first period of the unit of time.

The second period of the unit of time is used for receiving an indication code on the locomotive. Looking at cam 17, its raised portion extends for a 240° sector, which sector is so positioned on the cam that it first engages its associated contact 42 at the end of the period during which the control cams are active. As will appear later in the description, the apparatus on the locomotive is placed in condition for receiving an indication impulse during the first 120° of the raised portion of the cam 17, as it rotates in engagement with its contact 42. It follows then that the second period of the unit of time is used for the function of receiving an indication on the locomotive. The third period of the unit of time is used to send or receive a signal between the locomotive and the caboose. Looking at the cam 16, which provides the signaling impulses, its cam lobes 41 are positioned so as to engage the associated contact 42 during the third 120° of a rotation. In signaling between the locomotive and the caboose, it is necessary to receive on the locomotive as well as to send and thus the raised portion of the cam 17 is extended to include this third 120° movement of a rotation for the purpose of connecting the receiving apparatus on the locomotive to the inductors during the signaling period. Thus as the cams of Fig. 1 are constantly rotated at a uniform rate by the motor 11, the three periods, one for control, one for indication and one for signaling are alternately repeated.

While in the Fig. 1, the coding is accomplished by closing intermittently the output circuit of the generator G, it can be done in many ways by attaching the cam operated contacts 42—42ª to different parts of the oscillator. Also it can be done by having the cam contacts short-circuit the output coils 29 and 30 instead of closing the circuit as shown in the drawings. The method employed in Fig. 1 serves to illustrate all these methods of accomplishing the interruption of the power supplied by the generator G. It is, of course, possible to utilize other types of code senders such, for example, as a chain of counting relays.

The power thus supplied by the coils 29 and 30 to the traffic rails 1 and 1ª is in the form of a group of impulses of modulated carrier current. The number of impulses in a group and the spacing between the impulses of a group are determined by the position of the lobes 41 while each group of control impulses is separated from the succeeding and preceding groups by a time interval equal to that of two periods of the assumed unit of time. Thus far, the function of the apparatus may be summed up as follows: When the brake valve handle is in the running position, contact is made between segments 4 and 6 to select the circuit between the generator G and the inductors 29 and 30 that includes the contacts operated by the cam 13. The code that is transmitted under this condition is that produced by the raised lobes 41 of cam 13 and consists of two impulses, a pause, and then three impulses. Each code group is separated by a long interval which is equal to two periods of the unit of time. This code is repeated once each rotation of the cam as long as the brake valve handle remains in the running position. With the valve in the release position, the circuit selected includes the contacts 42—42ª operated by the cam 12, and the code group consists of four impulses with each group separated by a time interval equal to two periods of the unit of time. When the valve is moved to the lap position, the code consists of three impulses, a pause, and a single impulse. In the service position, no code is sent, but in the emergency position of the valve B, the cam 15 is selected and the code consists of two impulses, a pause, and two impulses.

Referring now to Fig. 2, the apparatus here shown is located at a second point on the train which, as previously stated, I shall consider to be in the caboose. This caboose is provided with a main reservoir $M^R$, a feed valve $F^V$ and a plurality of electropneumatic valves D adapted to reproduce the function of the usual engineer's valve on the locomotive. It will be understood, of course, that the caboose is further provided with a compressor, etc., to insure a proper supply of air pressure in the reservoir $M^R$. Valves $D^C$, $D^R$ and $D^E$ are each biased to the closed position and each valve is opened when its associated magnet 50 is energized. The valve $D^S$ is biased to its open position and is closed when its associated magnet 50 is energized. When valve $D^C$ is open, that is, when its magnet 50 is energized, main reservoir $M^R$ is connected with the brake pipe BP so that the apparatus will then represent the condition which exists on the locomotive when the engineer's valve is in the release position. When the valve $D^R$ is open, the brake pipe is connected with the feed valve $F^V$, thereby reproducing the condition existing on the locomotive when the engineer's valve is in the running position. When the valve $D^S$ is open, that is, when its magnet 50 is deenergized, the brake pipe is connected to the atmosphere through vent of such characteristics as to produce a reduction in the brake pipe pressure at substantially the service rate of the usual brake valve to effect a service application of the brakes. When the valve $D^E$ is opened by its magnet 50 being energized, the brake pipe is connected to atmosphere through vent of such characteristics as to cause an emergency rate of reduction of brake pipe pressure and an emergency application of the brakes. When the valve $D^S$ is energized, and the remaining valves $D^C$, $D^R$ and $D^E$ all deenergized, the supply and exhaust of the brake pipe are both blanked and the condition reproduced by the caboose apparatus corresponds to the lap position of the engineer's brake valve. The magnets 50 of the several valves are controlled by the slow-releasing relays $R^C$, $R^R$, $R^L$ and $R^E$.

Another feature of my invention is to provide that the apparatus both in the caboose and on the locomotive shall operate on the "closed circuit" principle, and to this end, the magnet 50 of the service valve $D^S$ in the caboose is energized whenever any one of the other magnets is energized. When the relay $R^R$ is energized, in a manner to be fully described later, as the result of the engineer's valve being placed in the running position, current is supplied by battery 51 along wire 52, armature 53 of the relay $R^R$, magnet 50 of the valve $D^R$, wire 54, magnet 50 of the valve $D^S$, and back to battery 51 by the wire 55. In the event the relay $R^C$ is energized, as it will be when the engineer's valve is placed in the release position, the circuit from battery 51 will extend from the wire 52, through armature 56 of relay $R^C$, magnet 50 of the valve $D^E$, wire 54, magnet 50 of valve $D^S$ and back to the battery by the wire 55. Again when the engineer's valve is in lap position, the relay $R^L$ is energized and the front contact of its armature 57 is closed to complete the circuit from the battery 51 through armature 57, resistance 147, and the magnet 50 of the valve $D^S$. Again with the relay $R^E$ energized, as it will be when the engineer's valve is placed in the emergency position, then the circuit from the battery 51 includes magnet 50 of the valve $D^E$ and the magnet 50 of the valve $D^S$ in series. With the service valve thus normally energized, the loss of control for any reason whatsoever results in a service application of the brakes. The control of the relays $R^C$, $R^R$, $R^L$ and $R^E$, I will now describe.

The caboose is provided with pick-up coils 58 and 59 located in inductive relation with the traffic rails 1 and $1^a$, respectively. At times these pick-up coils are connected with the primary 63 of a transformer 65 by a circuit that includes the back contact 60 of a relay 61, key 151 and a condenser 62. This circuit is tuned by the condenser 62 to resonance at the frequency of the carrier current produced by the generator G on the locomotive. The secondary 66 of transformer 65 is connected in circuit with a condenser 67, and a reactance 68, and this circuit is likewise tuned to resonance at the frequency of the carrier current. This apparatus designated as a whole by the reference character J constitutes therefore a filter having two stages both of which are tuned at the frequency of the carrier current, and this filter therefore serves to prevent influences of current from other sources of power on the apparatus that controls the brake valves D. Associated with the filter J is an amplifier indicated as a whole by the reference character A. As here shown, the amplifier comprises two electron tubes $T^1$ and $T^2$ of the usual and well known form each of which is provided with a grid, a filament and a plate. The filament 70 of the tube $T^1$ is constantly heated by a battery 72. The grid 69 of the tube $T^1$ is connected to one terminal of the condenser 67 while the opposite terminal of the condenser 67 is connected with the filament through a grid biasing battery 73. It will be apparent, therefore, that when modulated carrier current is being supplied to the track rails 1 and $1^a$, the electromotive force which is impressed on the primary 63 of transformer 65 by the pick-up coils 58 and 59 is stepped up by transformer 65 after which it is applied between the grid and filament of tube $T^1$. The plate circuit of tube $T^1$ includes the primary of a transformer K and a battery 74. This primary is made up of two parts $75^a$ and $75^b$ which are connected in series in such a manner that when electromotive forces induced therein by stray changing fields uniform throughout the volume of the transformer K will neutralize each other. The secondary of this transformer is similarly made up of two parts $76^a$ and $76^b$ and this secondary is connected with the primary 77 of a high ratio step-up transformer 78 through a full-wave rectifier 79. A secondary 80 of transformer 78 is included in the grid circuit of the tube $T^2$, which circuit also includes the grid biasing battery 81. A condenser 82 is connected across the primary 77 of transformer 78 to tune this transformer to resonance at the modulation frequency of the generator M on the locomotive.

Two condensers 83 and 84 are connected between the plate and the filament of tube $T^2$. These condensers are of the same size and have a comparatively large capacity so that any high frequency current which might flow in the plate circuit of tube $T^2$ will be by-passed to the filament of $T^2$. A reactance 85 is connected across the condenser 84, and it will be noted that due to the condenser 83 acting as a blocking condenser, no unidirectional current flows in the reactance. A portion of 85 is connected to another reactance 86, through a condenser 87 and the closed circuit thus formed is tuned to resonance at the modulation frequency of the generator M on the locomotive. A portion of 86 is connected through a full-wave rectifier 88 with a selector P which may be of any convenient type many of which are known to the art. Among them are the Western Electric telephone selector and the counting relay selector used in many centralized control systems for railways. The operation of this receiving apparatus as a whole is such that the modulated carrier current pick-up by the coils 58 and 59 produces a variation of the plate current of $T^2$ of a frequency equal to the modulation frequency, and a pulsating direct current flows in the output circuit of the rectifier 88. When the modulated carrier current is interrupted or coded, then impulses of direct current will flow in the output circuit of the rectifier 88.

In accordance with the code that is received by the coils 58 and 59 and amplified by the amplifier A, the selector P provides an energizing impulse to the respective slow-releasing relay R for each group of the code impulses received. For example, the relay $R^C$ is energized whenever the code consists of a group of four impulses as produced by the cam 12 in response to the brake valve being placed in the release position. The relay $R^R$ is energized when the engineer's brake valve is in the running position, and a code corresponding to that produced by the cam 13 is delivered to the receiving apparatus in the caboose. Again the relay $R^L$ is selected when the code corresponding to that produced by the cam 14 is received at the caboose. Also the relay $R^E$ is selected when the brake valve B is in the emergency position and the code corresponds to that produced by cam 15. All these relays are made slow-releasing so that they retain their armatures in the energized position during the interval between energizing impulses, that is, during the interval that exists between two code groups. These slow-releasing relays receive their power from the battery 51 over a circuit that includes the primary 93 of a transformer 94, coil of the respective relay and a contact of the selector P.

The secondary 95 of the transformer 94 is connected with a quick acting relay 97 in series with a half-wave rectifier 96 which is so directed that the voltage induced in the secondary 95 when a selector contact is broken is in the high resistance direction of the rectifier and therefore does not produce enough current to energize the relay 97. When the selector contact is made, the voltage induced in the secondary 95 is in the low resistance direction of the rectifier and therefore energizes the relay 97 for a very short interval of time and closes its armature 98. The function of this relay 97 will appear later in the specification.

The operation of the apparatus shown in the Figs. 1 and 2 thus far can be summed up as follows: When the engineer's brake valve B is in the running position, the carrier current generated by G and modulated by M is coded by the cam 13, and the code impulses are delivered to the rails 1 and 1ª through the coils 29 and 30. These code impulses are then picked up by the coils 58 and 59 at the caboose amplified by A and delivered as a direct current impulse to the selector P. The selector P at the end of the code group closes a contact in the circuit for the relay $R^R$ which energizes that relay. The energizing of the relay $R^R$, in turn, closes the circuit to the magnet valves $D^R$ and $D^S$, the result being that the auxiliary brake control apparatus in the caboose reproduces the running condition of the engineer's valve. In a like manner, when the engineer's valve is in the release, lap or emergency position, the coded modulated carrier current will be picked up by the coils 58 and 59 with the result that in the caboose, the valves $D^C$ and $D^S$, $D^S$ or $D^E$ and $D^S$ will be selected, respectively thereby causing the auxiliary mechanism to register with the corresponding position of the engineer's valve. When the engineer's valve is placed at service position, no code is delivered and all the valves in the caboose are deenergized with the result that the auxiliary mechanism effects a service application of the brakes.

In my invention, as here described, I have provided indication apparatus on the locomotive controlled by the auxiliary brake mechanism in the caboose, so that the locomotive driver will know whether or not the condition that he has set up on the locomotive is being duplicated in the caboose. This necessitates the provision of transmitting apparatus on the caboose and receiving apparatus on the locomotive. As stated earlier in the description, time in my system is divided into three alternate periods, the second period being allotted to the function of indication. The sending of the indication impulse by the apparatus in the caboose, and the receiving of the same on the locomotive must therefore take place during the second period. The caboose apparatus also must be so synchronized with the locomotive apparatus that it keeps in step with the rotation of the cams on the locomotive. Referring to Figs. 2 and 3, there is provided in the caboose, a chain of counting relays for each of the four conditions of the brakes, release, running, lap and emergency. The relays belonging to the chain corresponding to release position of the brakes are designated by the reference character C plus a numeral that indicates the position of the relay in the chain. The relays belonging to the chain associated with the running position are designated by the reference character R plus a numeral to indicate the relay's position in the chain. Likewise, the relays of the chain associated with the lap position are designated by the reference character L plus a numeral. The relays of the chain for the emergency position are designated by E plus a numeral.

Each chain of relays is used when selected to produce a code which will light an appropriate lamp on the locomotive to show the condition of the auxiliary brake mechanism in the caboose. As the indication function takes place during a period of time in which no control current is being supplied to the rails by the locomotive apparatus, I prefer to use a modulated carrier current for the indication, which has the same frequency as the control current supplied with the locomotive. It will be understood, however, that my invention is not limited to any particular frequency for the control current or for the indication current. In the caboose there is mounted a generator G and a modulator M similar in all details to those described in connection with the locomotive carried apparatus of Fig. 1. This generator G and modulator M in the caboose need not, therefore, be further described other than to point out that the secondary 89 of its output transformer has one terminal connected to the coil 59 by a wire 91 and that the other terminal of the secondary 89 is connected to the outside terminal of the coil 58 through a condenser 90 by a circuit intermittently closed by some one of the chain of relays in a manner to be shortly described.

In order to provide that the return indication shall mean not only that the control impulses have reached the caboose but that the appropriate valves have been energized and have functioned, each valve is provided with a group of movable contacts which make on their front contacts when the valve is energized and on their back contacts when the valve is deenergized. These contacts are included in the circuit of the first relay of the chain of relays. Taking the relay C1 for example, we find this relay energized by current supplied from the positive terminal of the battery 51 along wires 52 and 92, winding of the relay C1, a back contact 99 of the relay C2, wire 100, contact 101 closed when the magnet of $D^C$ is energized, back contact 102 closed when $D^R$ is deenergized, front contact 103 closed when $D^S$ is energized, back contact 104 closed when $D^E$ is deenergized, wire 105, armature 98 of the relay 97, and back to the battery 51. Referring next to the relay R1 of the chain of relays associated with the running condition of the brakes, we find this relay supplied with power from battery 51 over wires 52 and 92, winding of R1, back contact 106 of the relay R2, wire 107, front contact 108 of $D^R$, back contact 109 of $D^C$, front contact 110 of $D^S$, back contact 111 of $D^E$, wire 105, armature 98 of the relay 97 and to the battery 51. The relay L1 of the chain of relays associated with the lap position of the brake valve is provided with a similar circuit that includes the back contact 112 of relay L2, wire 154, a front contact 113 of $D^S$, back contacts 114, 115 and 116 of $D^C$, $D^R$ and $D^E$, respectively. Likewise, the relay E1 of the chain of relays associated with the emergency position of the brakes is provided with a similar circuit as will be readily observed by an inspection of the Figs. 2 and 3.

The first relay of each chain of relays is thus energized over a back contact of the valves that are deenergized and over a front contact of the valves that are energized and so arranged that a chain of relays cannot be selected nor in indication code started unless all the valves are in the proper position. With the valves properly positioned for a given brake condition then the first relay of the respective chain of relays will receive an energizing impulse each time the relay 97 is momentarily picked up as the result of a group of code impulses effecting the closing of a contact of the selector P in the caboose.

Each time that the relay $R^R$ receives an impulse at the end of each code group coming from the locomotive under running condition of the brakes, the relay R1 also receives an energizing impulse from the battery 51 through the armature 98 due to the fact that the impulse to the relay $R^R$ induces an impulse in the secondary 95 that picks up relay 97. As the relay R1 picks up, current is supplied to the second relay R2 from the battery 51 through the front contact 213 of the relay R1, and a back contact 214 of the relay R3. As relay R2 picks up, it closes the circuit for relay R3 at its front contact 215 and opens the circuit to the relay R1 at its back contact 106. When relay R3 picks up its front contact 216 is closed and cooperating with the back contact 117 of relay R5 allows relay R4 to pick up and so on through the chain of counting relays. As soon as one relay picks up, the preceding relay drops because it is energized over a back contact of its succeeding relay. Relays R1, R3, R6, R8 and R10 are provided with front contacts 118, 119, 120, 121 and 122, respectively. These contacts are all connected in parallel and control the output circuit from the generator G in the caboose in such a way that a code is supplied to the inductors 58 and 59. The connection in this instance extends from the condenser 90 along wire 123, any one of the contacts 118, 119, 120, 121 or 122, wire 124, front contact 125 of the valve $D^S$, wire 126 and to the outside terminal of 58. As this connection is closed only during the interval when one of the contacts of the chain of relays is closed and as no two successive relays are provided with a contact, it follows that the current supplied by the generator G to the coils 58 and 59 is coded and that the code in this instance consists of a group made up of two impulses, a pause, (relays R4 and R5 both being without a code contact) and three impulses.

Considering the case where the brake valve is in the release position, so that the relay $R^C$ receives an impulse at the end of each code group and also that the relay C1 receives an impulse through the armature 98 each time an impulse is delivered to the relay $R^C$. With the relay C1 thus energized, the associated chain of relays will be successively energized in a manner similar to the chain of relays associated with the running position of the brakes. As the relays C1, C3, C5 and C7 are each provided with a contact that closes the connection between wires 123 and 124, that is between the output of G and the coils 58 and 59, it follows that the indication code under the release condition of the brakes will consist of a group of four impulses. Again in the event the brake valve is placed at the lap position, so that the relay $R^L$ receives an energizing impulse at the end of each group of the control code impulses, and the relay L1 likewise receives an impulse. With relay L1 picked up, the relays of the chain of relays associated therewith are successively energized and as the relays L1, L3, L5 and L8 are each provided with a contact that closes the connection between the output of G and the coils 58 and 59, the indication code for the lap position consists of three impulses, a pause, and a single impulse. Likewise when the brake valve is placed at emergency position so that the relay $R^E$ is energized, the E chain of counting relays is selected and the indication code consists of two impulses, a pause, and two impulses. In the event the brake valve is at service position where no control code is sent by the locomotive apparatus, then all the slow-releasing relays $R^C$, $R^R$, $R^L$ and $R^E$ in the caboose are deenergized, and the several chains of relays remain inactive and no indication is returned by the apparatus in the caboose to the locomotive.

As it is desirable to arrange in some way to open the receiving circuit on the caboose while indication code impulses are being supplied by the generator G to the coils 58 and 59, the relay 61 of Fig. 2 is provided and this relay is controlled by the first and last relay of a chain of relays. Let us consider first the chain of relays beginning with the relay C1 and ending with the relay C8. A front contact 225 is added to relay C1 and a back contact 226 to the relay C8. As relay C1 is picked up, it closes for an interval the contact 225 and completes a circuit beginning at battery 51 and extending along wires 52 and 127, winding of the relay 61, wire 128, front contact 225, and back to battery 51. The relay 61 is provided with a stick circuit that branches from wire 128 and includes wire 129, back contact 130 of relay E9, back contact 131 of relay L9, back contact 132 of relay R11, back contact 226 of relay C8, wire 133, front contact 134 and to the negative terminal of the battery 51. It follows that after relay 61 is once picked up by relay C1 closing front contact 225, it remains energized until its stick circuit is opened by the energizing of the relay C8 when it again becomes deenergized. Relay 61 is energized therefore during the interval between the picking up of the relay C1 and the picking up of the relay C8 which is the time during which the indication code is delivered to the coils 58 and 59. Relay 61 is provided with a back contact 60 which is included in one of the leads between the inductors and the filter J of the receiving apparatus. As long as relay 61 is energized, contact 60 is open and the receiving apparatus disconnected from the inductors. In the chain of relays beginning with the relay R1 and ending with relay R11, front contact 135 of relay R1 and back contact 132 of R11 functions in the same manner to control the relay 61. Likewise the front contact 136 of the relay L1 and the back contact 131 of relay L9 functions to operate the relay 61 as also does the front contact 137 of relay E1 and the back contact 130 of E9.

Referring again to Fig. 1, the locomotive is equipped with a receiving circuit that includes the primary 138 of a filter J. This primary is at times connected to the inductors 29 and 30 through a condenser 139. The characteristics of the condenser 139 are such as to tune this circuit to resonance at the frequency of the generator G of the caboose. The output of the filter J on the locomotive is supplied to an amplifying device A which may be, and in this instance is similar to the corresponding amplifying device in the caboose. The output of the amplifying device on the locomotive is supplied to a selector P which likewise may be similar to the selector P of the auxiliary mechanism. The selector P on the locomotive controls the four slow-releasing relays $N^C$, $N^R$, $N^L$ and $N^E$ which corresponds to the release, running, lap and emergency positions of the brakes, respectively. Each of these relays control through a front contact a circuit for energizing the respective lamps C, R, L and E.

With the auxiliary brake apparatus in the running position, and sending out a corresponding indication code impulse, these indication code impulses are picked up by the inductors 29 and 30 on the locomotive, amplified and demodulated by the locomotive receiving apparatus and applied to selector P which, in turn, supplies an energizing impulse to the relay $N^R$ at the completion of each group of the indication impulses. With the relay $N^R$ energized, the lamp R is illuminated to indicate to the operator of the locomotive that the auxiliary apparatus is in the running condition. With the auxiliary apparatus set in release position and a corresponding indication code sent out, then the relay $N^C$ on the locomotive is selected and the lamp C illuminated to indicate the release condition of the caboose apparatus. Likewise with the caboose apparatus sending out an indication corresponding to the lap position, the relay $N^L$ on the locomotive is energized and the lamp L illuminated. Also the emergency position of the caboose apparatus results in the relay $N^E$ on the locomotive being energized and the lamp E illuminated. The primary 138 of the receiving apparatus on the locomotive has one terminal connected to the inductors 29 and 30 through the contact 42—42ª of the cam 17 while the other terminal of 138 is connected to the other terminal of the inductors through the condenser 139 and the contact 48 of a service valve SV. As the cam 17 maintains a fixed relation with the control cams 12, 13, 14 and 15, and as its raised portion is so positioned that it engages the associated contact 42 immediately following the period when the cam lobes 41 of the control cams are active to engage their respective contacts, it follows that the receiving apparatus on the locomotive is connected to the inductors 29 and 30 immediately after the sending of a group of control code impulses. On the caboose, the disconnecting of the receiving apparatus and the sending of the indication code by a chain of counting relays always follows the completion of the receiving of a control code. The time required by the counting relays in the caboose to send an indication code is made such that they complete their function within the time that it takes the cams on the locomotive to make a 120° movement. In other words, the sending of the indication code is completed during the second period of the unit of time. It is apparent, therefore, that the apparatus on the locomotive and the auxiliary apparatus in the caboose are maintained in step with each other to alternately send and receive the control and indication codes.

In series with the group of indicating lamps C, R, L and E is a slow-release relay 140 which is therefore energized as long as any one of the indication lamps is illuminated. In series with the output circuit of the generator G on the locomotive is the rectifier 45 and the relay 46 which relay will therefore be energized as long as a control code is being periodically delivered to the inductors 29 and 30. The two relays 46 and 140 control over their front contacts 141 and 142, respectively, a circuit to the magnet 50 of the valve SV which circuit is supplied with current by a battery 143. The valve SV is arranged to close a vent 144 in the brake pipe when it is energized. The characteristics of the vent 144 are such that a service application of the brakes is obtained whenever the valve is deenergized. The valve SV is deenergized when the brake control power supplied by generator G fails and the relay 46 is deenergized or when the return indication fails to be received on the locomotive and relay 140 deenergized.

In order to insure that whenever SV is deenergized and a service application results on the locomotive, that the same is also produced in the caboose, the movable part of the valve SV has attached to it a front contact 48 which is open whenever the valve is deenergized. As previously pointed out, the contact 48 is included in the connection between the output of the generator G and the inductors 29 and 30. It follows then that as soon as a service application is produced on the locomotive by the deenergizing of the valve SV, the control code is shut off and there is no energy transmitted to the caboose to hold the auxiliary brake mechanism in any other position and thus it assumes a service application condition.

To enable the locomotive driver to take charge of the service application as soon as it has been made automatically, the movable segment 18, operated by the brake valve handle 3 and the stationary contacts 9 and 10 are provided. With brake valve B moved to service position, the segment 18 bridges contacts 9 and 10 and closes a circuit from the battery 143 to the relay 145 as will be evident by an inspection of the Fig. 1. With relay 145 energized to close its front contact 146, current is supplied from battery 143 to the magnet 50 of the valve SV, and the vent 144 closed. Relay 145 is made slow-releasing so as to hold the valve closed a sufficient length of time after the brake valve B has been removed from the service position to enable relays 46 and 140 to be energized before relay 145 drops. This arrangement of circuits not only enables the locomotive driver to take charge of a service application as far as the locomotive apparatus is concerned but also makes him independent of the automatic valve SV when he makes a service application manually. Without this arrangement, the failure of a return indication which is discontinued whenever a service application is made at a caboose in response to the handle 3 being placed at service would open two service vents on the locomotive simultaneously. As previously pointed out, the caboose apparatus is arranged so that the service valve $D^S$ is energized in series with each of the other magnet valves and in the lap position is the only valve on the caboose energized. In order to insure that if, for any local reason, valve $D^S$ is deenergized and a service application is produced in the caboose, that it is duplicated on the locomotive, a front contact 125 is attached to the movable part of the valve $D^S$ which when opened discontinues the indication code. The failure to receive an indication code on the locomotive deenergizes the relay 140 and a service application is then made by the valve SV. From the foregoing description, it is apparent that the "closed circuit" principle is maintained throughout the apparatus of my invention. While in this disclosure I have shown the service valve as the one to be arranged in series with each of the other valves, it is to be understood that I do not limit myself to this arrangement, and that any of the other valves may be so placed as it seems desirable.

The apparatus on the locomotive used for signaling includes the cam 16 and the key 148. The code transmitted by the cam 16 is made different from any of the codes used for control of the brakes. The key 148 when depressed by one of the locomotive crew completes a circuit from the transformer 26 of the generator G along wire 43, contact 42—42ª of cam 16, key 148, wire 47, inductors 29 and 30, contact 48 and wire 49 back to the output transformer. It follows that by the operation of the key 148, a signaling code is supplied to the traffic rails by means of the cam 16. As the cam lobes 41 of the cam 16 are positioned to engage their associated contact 42, during the third 120° movement of each revolution of the cams, that is, during the third period of the unit of time, a signaling code can be sent from the locomotive under any brake condition. The three functions, control, indication and signaling following each other alternately each being completed during one third of a revolution of the cams. In the caboose, there is provided a relay $S^R$, which is selected by the selector P in response to a signaling code produced by the cam 16. Through the front contact 149 of the relay $S^R$ current is supplied to the signaling device 150 which may be a bell, a light, or a whistle.

To transmit a signal code from the caboose, I prefer to make use of the apparatus as shown in the Fig. 4. In Fig. 4, C8, R11, L9 and E9 represent the last relay of the respective chains of relays of Fig. 3 used for transmitting the return indication. An additional chain of relays, beginning with S1 and ending with S9 is provided for transmitting a signal code from the caboose to the locomotive. The first relay S1 is energized over a front contact of the last relay of whichever indication chain of relays happens to be operating at the time, and over a back contact of a manually operated key 152. Relays S1, S3, S5, S7 and S9 each being provided with a contact that closes the output of the generator in the caboose with the inductors 58 and 59, it follows that with the key 152 pressed down, the signaling code produced by this chain of relays is sent immediately following the brake indication code. The function of the chain of relays to produce the signaling code is identical with that already described. Mechanically connected with the key 152, as indicated by a dotted line, is a contact 151 through which contact the receiving circuit in the caboose is controlled so that whenever key 152 is depressed to send a signaling code, the receiving apparatus in the caboose is disconnected from the inductors. On the locomotive there is provided a relay $N^s$ which is energized by the selector P in response to the receiving on the locomotive of a code corresponding to that produced by the counting relays of the Fig. 4. A signaling device 153 is controlled through the front contact of the relay $N^s$.

To sum up the operation of the apparatus of this system, let us first assume that the engineer's valve is in its normal or running position, as shown in the Fig. 1. As the cam 13 rotates and its lobes 41 engage the contact 42, a group of code impulses is delivered to the rails. The inductors on the caboose pick up these impulses and at the end of the group an energizing impulse is supplied to the relay $R^R$ to pick up that relay. As relay $R^R$ is picked up, the brake valves $D^R$ and $D^S$ are energized. At the same time that relay $R^R$ is supplied with an impulse, the relay C1 is momentarily energized to start that chain of relays and also the relay 61 is energized to disconnect the receiving apparatus. As the chain of relays function, the caboose apparatus supplies to the rails a group of indication code impulses corresponding to running condition. The cam 17 on the locomotive has in the meantime rotated to connect the receiving apparatus on the locomotive to the inductors and the indication impulses are picked up and the relay $N^R$ selected to illuminate the lamp R. This action will be alternately repeated with the signaling period between each successive indication and control periods. Due to the slow-releasing feature of the relay $R^R$ on the caboose, and the relay $N^R$ on the locomotive, the valves $D^R$ and $D^S$ of the auxiliary apparatus are held continuously energized and the lamp R on the locomotive continuously illuminated. In the case the crews desire to communicate with each other, they can do so by operating their respective keys, the exchange of signaling codes taking place during the signaling period. In a like manner, the apparatus will function for any of the other positions of the brake valve B. While in this description, I have made use of a modulated carrier current, it is to be understood that my invention is equally adapted to the use of a coded alternating current not modulated. In the Fig. 5 there is shown a modified form of a generator of the electron tube type that might be used when modulation is not provided. In Fig. 5, the output secondary 28 would be connected to the wires 43 and 49 the same as the secondary 28 of the generator G of the Fig. 1. When the output is not modulated then the receiving device would be modified somewhat. A form that might be used for the receiving device is disclosed in the Fig. 6.

In Fig. 6 incoming oscillations are received by the primary 138 and the two stage input filter J has each stage tuned to resonance at the frequency of the incoming oscillations. These incoming oscillations are then imposed on the grid of the first stage tube $T^3$. The primary of an interstage transformer $K^2$ is included in the plate circuit of tube $T^3$. The secondary of the transformer $K^2$ includes two parts $156^a$ and $156^b$ with the condenser 157 connected in series and the closed circuit thus formed is tuned to resonance at the frequency of the incoming oscillations. One terminal of the condenser 157 is connected to the grid of the second stage tube $T^4$ while the other terminal of 157 is connected to the filament through a biasing battery 158. It will be evident therefore that the transformer $K^2$ constitutes an interstage transformer by means of which the alternating component of the plate current of the tube $T^3$ is made to create an alternating difference of potential between the grid and filament of the tube $T^4$. The plate circuit of $T^4$ includes the primary of a transformer K similar in construction to the transformer K of Fig. 2. Each code impulse of the incoming oscillations induces an electromotive force in a secondary of the transformer K which is then applied to the full-wave rectifier 159, the output terminals of which are connected to the selector. The selector of Fig. 6 is thus supplied with an impulse of unidirectional current for each code impulse of the incoming oscillations. If necessary of course, additional stages of amplification can readily be provided. The selector will operate the control relays the same as described for Fig. 2. The remaining apparatus both on the locomotive and on the caboose will remain under this condition where the current is not modulated the same as previously described and the operation of the system will be substantially the same as has already been pointed out.

Although I have herein shown and described only certain forms of apparatus embodying my invention, it is understood that various changes and modifications may be made therein within the scope of the appended claims without departing from the spirit and scope of my invention.

Having thus described my invention, what I claim is:

1. Apparatus for the control of the brakes of a vehicle including, a brake controlling mechanism capable of producing the release, running, lap, service and emergency functions of the vehicle brakes, electroresponsive means associated with the brake controlling mechanism selectively responsive to different codes of current for causing the brake controlling mechanism to produce the several different brake functions, a current source adapted to supply the different codes of current to said electroresponsive means, and means to select the code to be supplied by said source and thereby determine the brake function produced.

2. Apparatus for the control of the brakes of a vehicle including, a brake controlling mechanism capable of producing the release, running and brake applying functions of the vehicle brakes, electroresponsive means associated with the brake controlling mechanism selectively responsive to different codes of current for causing the brake controlling mechanism to produce the different brake functions, a current source adapted to supply the different codes of current to said electroresponsive means, and means to select the code to be supplied by said source, and thereby determine the brake function produced.

3. Apparatus for the control of the brakes of a railway train including, a brake controlling mechanism located at one position on the train capable of producing the release, running, lap, service and emergency functions of the train brakes, electroresponsive means associated with the brake controlling mechanism selectively responsive to different codes of current for causing the brake controlling mechanism to produce said brake functions, a current source adapted to supply the different codes of current to said electroresponsive means, and a manually operated means located at a second position on the train to select the code to be supplied by said source and thereby determine the brake function produced.

4. Apparatus for the control of train brakes comprising in combination, a source of current, coding means located at one point on the train for coding the output of said source at a different code for each of the release, running and brake applying functions of the train brakes, a brake controlling mechanism located at another point on the train capable of producing the release, running and brake applying functions of the train brakes, receiving means at said other point influenced by said coded current, and decoding means controlled by said receiving means selectively responsive to the different codes for causing the brake controlling mechanism to produce the brake function of the train brakes corresponding to the code supplied.

5. Apparatus for the control of train brakes comprising in combination with the usual engineer's valve on the locomotive, a source of current, means for coding the output of said source at different codes for different positions of said engineer's valve, auxiliary brake controlling mechanism at another point on the train capable of reproducing the functions of the engineer's valve, and controlling means associated with said auxiliary mechanism and selectively responsive to the several codes of said current for causing the condition of the auxiliary mechanism to register with the position of the engineer's valve.

6. Apparatus for the control of vehicle brakes including, a plurality of electropneumatic devices each capable of producing a respective condition of the vehicle brakes, circuit means to selectively energize said electropneumatic devices to establish the different conditions of the vehicle brakes, a magnet normally energized when any one of the electropneumatic devices is energized, and means controlled by said normally energized magnet to apply the brakes when said magnet is deenergized.

7. Apparatus for the control of train brakes including, electropneumatic devices to establish release, running and emergency condition of the brakes respectively, and each normally biased to an inactive condition, another electropneumatic device to establish a service application condition of the brakes and biased to an active condition, a circuit means to energize the service device in series with anyone of the first mentioned devices to render the service device inactive to apply the brakes and said other device active to control the brakes.

8. Apparatus for the control of train brakes comprising in combination with the usual engineer's valve; an auxiliary mechanism at another point on the train which includes electropneumatic devices to establish release, running and emergency conditions of the brakes respectively each normally biased to an inactive position, and another electropneumatic device to establish lap or service application condition biased to an active position; a plurality of control circuits adapted to energize the service device in series with any one of the first mentioned devices or to energize the service device alone for causing said auxiliary mechanism to effect release, running, lap, service or emergency condition of the brakes, and means controlled by the engineer's valve to selectively control said plurality of circuits.

9. Apparatus for the control of train brakes comprising, in combination with the usual engineer's valve on the locomotive, an electroresponsive device on the locomotive having a transmitting and a receiving condition arranged to transmit a different coded current for each functional position of the engineer's valve during its transmitting condition and to establish an indication corresponding to the code received during its receiving condition, an auxiliary brake mechanism at another point on the train, an electroresponsive device for said auxiliary mechanism having a transmitting and a receiving condition for causing the auxiliary mechanism to reproduce the brake function corresponding to the code transmitted by the locomotive electroresponsive device and to transmit a code corresponding to the position of the auxiliary mechanism during its transmitting condition, and an automatic means for causing said electroresponsive devices to alternately assume their transmitting and receiving conditions arranged that when one is receiving the other is transmitting.

10. Apparatus for the control of train brakes comprising, in combination with the usual engineer's valve on the locomotive, auxiliary brake controlling mechanism at another point on the train capable of reproducing the functions of the engineer's valve, means for causing the condition of said auxiliary mechanism to register with the position of the engineer's valve, transmitting means including a source of current at said second point, means for coding the output of said source according to the condition of said auxiliary mechanism, means on the locomotive receiving the coded current delivered by said transmitting means, decoding apparatus associated with said receiving means, and signals selectively controlled by said decoding apparatus.

11. Apparatus for the control of trains comprising, a first electroresponsive device located at one point on the train, and a second electroresponsive device located at another point on the train each capable of exerting an influence over the other and each having a brake control, an indication and a signaling condition, means located at the first mentioned location for causing the first electroresponsive device to alternately assume its brake control, indication and signaling conditions, means at said other location for causing the second electroresponsive device to alternately assume its brake control, indication and signaling conditions in step with the corresponding condition of the first device.

12. Apparatus for the control of train brakes comprising, in combination with the usual engineer's brake valve on the locomotive; an electroresponsive device on the locomotive and a second electroresponsive device at another point on the train each capable of exerting an influence over the other and each having a brake control and an indication condition; locomotive carried means for causing the locomotive electroresponsive device to alternately assume its brake control and indication conditions, and means at said other point for causing said second electroresponsive device to alternately assume its brake control and indication conditions in step with the corresponding condition of the locomotive device.

13. Apparatus for the control of train brakes comprising, a main brake controlling mechanism capable of producing the usual different functions of the train brakes, an auxiliary brake controlling mechanism at another point on the train and capable of reproducing the functions of the main brake controlling mechanism, a normally energized electropneumatic device associated with each of said brake controlling mechanisms and each device adapted when deenergized to effect a service application of the train brakes, and means controlled by each electropneumatic device rendered active when its device is deenergized to deenergize the other electropneumatic device.

14. Apparatus for the control of train brakes comprising, in combination with the usual engineer's brake valve on the locomotive, an auxiliary brake controlling mechanism at another point on the train capable of reproducing the functions of the engineer's valve, a first and a second normally energized electromagnetic device associated with the engineer's brake valve and the auxiliary brake controlling mechanism respectively and each adapted when deenergized to effect a given condition of the brakes, and means controlled by each of said electromagnetic devices rendered active when its device is deenergized to deenergize the other electromagnetic device.

15. Apparatus for the control of train brakes comprising, in combination with the usual engineer's brake valve on the locomotive, auxiliary brake controlling mechanism at another point on the train capable of reproducing the functions of the engineer's valve, controlling means for causing the condition of said auxiliary mechanism to register with the position of the engineer's valve, indicating means on the locomotive controlled by said auxiliary mechanism, and means to simultaneously establish a given brake condition on the locomotive and by said auxiliary mechanism when either said controlling means or said indicating means fail.

16. Apparatus for the control of train brakes comprising, in combination with the usual engineer's brake valve on the locomotive, an auxiliary brake controlling mechanism at another point on the train capable of reproducing the functions of the engineer's valve, a first and a second normally energized electropneumatic device associated with the engineer's brake valve and the auxiliary brake controlling mechanism respectively and each adapted when deenergized to effect a service application of the brakes and means controlled by the engineer's valve when moved to its service position to annul the effect of the said first electropneumatic device.

17. A control system including, two spaced locations, a controlling mechanism at one location responsive to a predetermined control impulse of current, an indicating mechanism at the other location responsive to a predetermined indicating impulse of current, a signaling mechanism at each of said locations responsive to a predetermined signaling impulse of current, a transmitting and receiving means partly at each of said locations for operating said mechanisms, means for supplying successively a control, an indicating and a signaling impulse of current to said transmitting and receiving means, and means for causing simultaneous functioning of said mechanisms in response to such successive impulses of current.

18. Apparatus for the control of railway trains comprising, an electroresponsive device at each of two spaced locations on a train having a train controlling condition and an indicating condition, synchronizing means for causing said devices to alternately assume periodically the train controlling and indicating conditions in step with each other, a train governing mechanism at one location controlled by said devices during the train controlling condition for governing the operation of the train, and an indicating mechanism at the other location controlled by said devices during the indicating condition for indicating the position of the train governing mechanism.

19. Apparatus for the control of railway trains comprising, an electroresponsive device on the locomotive and a second electroresponsive device at another point on the train each having a transmitting and a receiving condition and each capable of exerting an influence over the other, locomotive carried means for causing the locomotive electroresponsive device to alternately assume periodically its transmitting and receiving conditions, synchronizing means at said other point for causing its electroresponsive device to alternately assume its receiving and transmitting conditions in step with the transmitting and receiving conditions of the locomotive device respectively, and means controlled by the said electroresponsive devices in response to the influence received during the receiving condition for governing the operation of the train.

20. Apparatus for the control of railway trains comprising, a manually controlled device having different positions corresponding to different operating conditions of a train, a transmitting means located at said device including a source of current coded at different codes corresponding to the different positions of said device, an operating mechanism at another location on the train selectively responsive to the different codes to produce the different operating conditions for the train, a transmitting means at the second mentioned location including a source of current coded at different codes corresponding to the different conditions of the operating mechanism, an indicating mechanism located at the manually controlled device selectively responsive to the different codes transmitted from said second mentioned location, and synchronizing means for causing the two transmitting means to periodically exchange code impulses between the two mentioned locations for producing simultaneous functioning of the operating and indicating mechanisms.

21. Apparatus for the control of railway trains comprising, a manually operated master controlling device at one location on a train adapted to establish a plurality of operating conditions for the train, a transmitting means located at said master controlling device including a source of current coded at different codes corresponding to the different operating conditions, an auxiliary controlling device located at another location on the train capable of reproducing the different operating conditions of the master controlling device, receiving and decoding means at said other location selectively responsive to the different codes for causing the auxiliary device to reproduce the operating condition established by the master controlling device, an indicating mechanism located at said master controlling device adapted to assume a different condition for each operating condition, a transmitting means at the second mentioned location including a source of current coded at different codes corresponding to the different conditions of the auxiliary controlling device, receiving and decoding means at the first mentioned location selectively responsive to the different codes transmitted from said second mentioned location for causing the indicating mechanism to assume a condition corresponding to the condition of said auxiliary mechanism, and synchronizing means for causing the two transmitting means to periodically exchange code impulses between the two mentioned locations for producing simultaneous functioning of the auxiliary controlling mechanism and the indicating mechanism.

In testimony whereof I affix my signature.

LARS O. GRONDAHL.